(12) United States Patent
Klank et al.

(10) Patent No.: US 11,376,919 B2
(45) Date of Patent: Jul. 5, 2022

(54) CHASSIS COMPONENT AND STABILIZER ARRANGEMENT FOR A CHASSIS OF A VEHICLE WITH SUCH A CHASSIS COMPONENT

(71) Applicant: ZF Friedrichshafen AG, Friedrichshafen (DE)

(72) Inventors: Michael Klank, Osnabrück (DE); Thomas Koehne, Osnabrück (DE); Julian Stratmann, Bad Essen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/240,086

(22) Filed: Apr. 26, 2021

(65) Prior Publication Data

US 2021/0347223 A1      Nov. 11, 2021

(30) Foreign Application Priority Data

May 6, 2020   (DE) ..................... 10 2020 205 698.6

(51) Int. Cl.
  *B60G 21/055*   (2006.01)
  *B60G 7/00*     (2006.01)
  *B60G 13/00*    (2006.01)

(52) U.S. Cl.
  CPC .......... *B60G 21/055* (2013.01); *B60G 7/005* (2013.01); *B60G 13/003* (2013.01); *B60G 2204/41* (2013.01); *B60G 2204/82* (2013.01)

(58) Field of Classification Search
  CPC .. B60G 21/055; B60G 21/0155; B60G 7/005; B60G 13/003; B60G 2204/14; B60G 2204/82
  See application file for complete search history.

(56) References Cited

U.S. PATENT DOCUMENTS

| 2019/0217679 A1* | 7/2019 | Kuroda | .................. B21D 53/10 |
| 2020/0070616 A1* | 3/2020 | Schwarze | .......... B60G 21/0553 |
| 2020/0139777 A1* | 5/2020 | Holtheide | ........... F16C 11/0661 |

FOREIGN PATENT DOCUMENTS

| DE | 2934295 A1 * | 3/1981 | .......... B60G 21/055 |
| DE | 102008041050 A1 * | 2/2010 | ............. B60G 7/005 |

(Continued)

OTHER PUBLICATIONS

Duval Philippe, "Machine Translation of FR 2985686 A1 Obtained Dec. 14, 2021", Jul. 19, 2013, Entire Document. (Year: 2013).*

*Primary Examiner* — James A English
*Assistant Examiner* — Scott F. Underwood
(74) *Attorney, Agent, or Firm* — Finch & Maloney PLLC; Michael J. Bujold; Jay S. Franklin (57) ABSTRACT

A chassis component (16), with a first end section (17) and a second end section (18) and a connecting section (19) is arranged between the two end sections (17, 18). At least one ball joint (21) is associated with one of the two end sections (17, 18), and a sensor device (22) is associated with the ball joint (21). A first sensor element (23) of the sensor device (22) is arranged on the end section (18) that has the ball joint (21) and a second sensor element (24) is arranged on an inner joint component (25) of the ball joint (21). In order to avoid damage to the chassis component (16) and/or a disturbance-inducing factor for the sensor device (22) caused by a tensile or compressive load, the connecting section (19) has an elastically deformable zone (20) preferably in the longitudinal and/or the transverse direction of the vehicle.

12 Claims, 4 Drawing Sheets

(56) References Cited

FOREIGN PATENT DOCUMENTS

| DE | 102015207178 A1 | * | 10/2016 | ........... B60G 21/055 |
| --- | --- | --- | --- | --- |
| DE | 10 2016 215 416 A1 | | 2/2018 | |
| DE | 102017103582 A1 | * | 8/2018 | ........... B60G 21/055 |
| DE | 102018205823 A1 | * | 10/2019 | .......... F16C 11/0609 |
| DE | 102018210449 A1 | * | 1/2020 | ........... B60G 21/055 |
| FR | 2985686 A1 | * | 7/2013 | ............ F16F 1/3849 |
| KR | 20170119350 A | * | 10/2017 | |
| WO | WO-2018043248 A1 | * | 3/2018 | ........... B60G 21/055 |
| WO | WO-2019088284 A1 | * | 5/2019 | ........... B60G 21/055 |
| WO | WO-2020129429 A1 | * | 6/2020 | ........... B60G 21/055 |

\* cited by examiner

PRIOR ART

Fig. 1

PRIOR ART

CHASSIS COMPONENT AND STABILIZER ARRANGEMENT FOR A CHASSIS OF A VEHICLE WITH SUCH A CHASSIS COMPONENT

This application claims priority from German patent application serial no. 10 2020 205 698.6 filed May 6, 2020.

FIELD OF THE INVENTION

The invention relates to a chassis component with a first end section and a second end section, wherein a connecting section is arranged between the two end sections, with at least one ball joint in one of the two end sections and with a sensor device associated with the ball joint, wherein a first sensor element of the sensor device is arranged on the end section that has the ball joint and a second sensor element is arranged on an inner joint component of the ball joint. In addition the invention relates to a stabilizer arrangement for a chassis of a vehicle with a chassis component of that type.

BACKGROUND OF THE INVENTION

A similar chassis component is known from DE 10 2016 215 416 A1. In that case the sensor device is in the form of an angle sensor device by means of which a position of the inner joint component relative to the chassis component can be determined.

Furthermore it is known to provide a stabilizer arrangement in the chassis of a vehicle. A stabilizer arrangement is generally known in motor vehicle technology, particularly in chassis construction, for use as a roll stabilizer. This is an arrangement that can be subjected to torsion and/or bending, which reduces the rolling movement of a vehicle. For the roll stabilization of the body of a motor vehicle a stabilizer arrangement can be arranged between the wheels and an axle of a motor vehicle. In particular a so-termed torsion-beam axle is used as a stabilizer arrangement. Such as torsion-beam axle can have two wheels or can connect two wheels of the same axle to one another. During alternate deflections of the wheels of an axle, the stabilizer arrangement distributes the axle load and thereby ensures a uniform axle load distribution. Thereby, the driving behavior of a motor vehicle can be influenced positively in such manner that, for example, the coefficient of adhesion of the wheels fitted on an axle can always be kept almost identical and at a good level.

A stabilizer arrangement in the form of a torsion-beam axle can be fitted by means of two rubber mountings to a vehicle frame or a vehicle body. In particular, to determine height level information it is desirable to equip a stabilizer arrangement, preferably a torsion-beam axle, with a sensor section of the type mentioned earlier.

SUMMARY OF THE INVENTION

The purpose of the present invention is to develop further a chassis component and/or a stabilizer arrangement of the type mentioned at the beginning, in such manner that a sensor device can be or is integrated in it. In particular, damage to the chassis component and/or a disturbance-inducing factor for the sensor device (22) caused by tensile or compressive loading, preferably in the longitudinal and/or transverse direction of the vehicle, should be avoided. Preferably, a stabilizer arrangement or a torsion-beam axle should be provided with such a chassis component. In particular, an alternative embodiment should be provided.

The objective on which the invention is based is achieved by a chassis component and/or a stabilizer arrangement according to the independent claim(s). Preferred further developments of the invention emerge from the subordinate claims and from the description given below.

The chassis component comprises a first end section and a second end section. In particular the two end sections are formed at two ends of the chassis component remote from one another. The chassis component can be of strut-like and/or essentially straight form. A connecting section is arranged between the two end sections. The connecting section can be of strand-like or bar-like form. The chassis component comprises at least one ball joint at one of the two end sections. Preferably, the ball joint is in the form of a ball stud joint. A sensor device is associated with the ball joint. In this case a first sensor element of the sensor device is arranged on the end section having the ball joint, and a second sensor element is arranged on an inner joint component of the ball joint. In particular, the inner component is in the form of a ball stud. The ball stud comprises a joint ball and a joint stud. In particular the inner joint component is fitted and able to move as an articulation in a recess of the chassis component. Preferably, the joint stud of the inner joint component extends out of the recess. The first sensor element can be in the form of a sensor which is sensitive to magnetic fields, in particular a Hall sensor or a 2D-rotation Hall sensor. The second sensor element can be a magnet or permanent magnet, preferably with diametral magnetization. In particular the second sensor element is arranged in the joint ball of the inner joint component. When the inner joint component moves within the recess of the chassis component, the magnetic field of the second sensor element changes relative to the first sensor element, and this change can be detected by the first sensor element. From this an angle and/or a change of angle between the inner joint component and the recess in the chassis component can be determined. According to the invention, the connecting section of the chassis component has an elastically deformable zone.

In this context it is advantageous that by virtue of the elastically deformable zone, any undesired damage to the chassis component caused by tensile or compressive loading can be avoided. In particular, by virtue of the elastically deformable zone a disturbance-inducing factor that would otherwise influence the sensor device in an undesired manner can be compensated. Preferably, the elastically deformable zone is in the form of a partially elastically deformable zone.

Preferably, the elastically deformable zone is formed by the connecting section itself. In other words, the whole of the connecting section can be made as the elastically deformable zone. Alternatively, the elastically deformable zone is formed by an elastic portion or part-section arranged in the connecting section. For example the elastic portion or part-section of the connecting section can be in the form of an elastomer. In particular, it can be sufficient if not the entire connecting section, but only a part-section of the connecting section is formed as the elastically deformable zone.

Preferably, an elastic deformation of the elastically deformable zone is restricted to exactly one specified spatial direction or to exactly two specified spatial directions. In particular, an elastic deformation of the elastically deformable zone is blocked in one, or exactly one specified spatial direction. Preferably, the blocking of elastic deformability relative to the specified spatial direction is obtained by virtue of a suitable structure of the elastically deformable zone itself. In particular, relative to the three spatial directions of a Cartesian vehicle co-ordinate system, the elastically deformable zone has an only partial elastic deformability. Preferably, in relation to a measurement direction that is relevant for the sensor device the elastically deformable zone is made inelastic, or rigid.

Specifically, a Cartesian vehicle co-ordinate system consists of three spatial directions, namely a first spatial direction that corresponds to an X-axis in the longitudinal direction of the vehicle, a second spatial direction that corresponds to a Y-axis in the transverse direction of the vehicle, and a third spatial direction that corresponds to a Z-axis in the vertical direction of the vehicle.

According to a further development, the elastically deformable zone enables an elastic deformation of the connecting section, in particular exclusively, in a specified first spatial direction. Thus, the elastic deformation can be restricted to the specified first spatial direction. In the directions different from the specified first spatial direction the connection section can be made rigid or inelastic. Preferably, the first spatial direction is one of three spatial directions that constitute a Cartesian vehicle co-ordinate system. In particular, the first spatial direction is an X-axis in the longitudinal direction of the vehicle. Particularly in an assembled condition of the chassis component in a chassis of a vehicle, the elastic deformation of the connecting section takes place by virtue of the elastically deformable zone in the specified first spatial direction.

According to a further embodiment, the elastically deformable zone enables an elastic deformation of the connecting section, in particular exclusively, in the specified first spatial direction and in a specified second spatial direction. Preferably, this direction of the elastic deformation is obtained by virtue of the fitting of the chassis component into a chassis of a vehicle. In this case the second spatial direction is one of three spatial directions that make up the Cartesian vehicle co-ordinate system. The first spatial direction is orientated perpendicularly to the second spatial direction. Preferably, the first spatial direction is an X-axis in the longitudinal direction of the vehicle and the second spatial direction is a Y-axis in the transverse direction of the vehicle. Thus, the elastic deformability of the connecting section by means of the elastically deformable zone can be restricted in the direction of the X-axis and/or of the Y-axis.

Preferably, the elastically deformable zone and/or the connecting section is made to be inelastic and/or rigid in a specified, in particular exclusive third spatial direction. In particular the third spatial direction is one of three spatial directions that make up the Cartesian vehicle co-ordinate system. The first spatial direction is orientated perpendicularly to the third spatial direction. In particular, the second spatial direction is orientated perpendicularly both to the first spatial direction and also to the third spatial direction. Preferably, the first spatial direction is an X-axis in the longitudinal direction of the vehicle and the third spatial direction is a Z-axis in the vertical direction of the vehicle. In particular, the second spatial direction is a Y-axis in the transverse direction of the vehicle.

Preferably, relative to a specified measurement direction the connecting section and/or the chassis component is made inelastic and/or rigid. In that way, if by means of the sensor device, for example height level information is to be determined, then relative to a vertical axis of the vehicle the connecting section is made inelastic or rigid. This can ensure that no disturbance-inducing factor attributable to an undesired elastic behavior of the chassis component is included in the determination. On the other hand, possible disturbances from other spatial directions can be compensated by virtue of the elastic deformability of the elastically deformable zone.

According to another embodiment, the elastically deformable zone has a multiple alternating concave-convex contour. In particular the elastically deformable zone has a wave-like or saw-tooth contour or configuration. In that way a desired elastic deformability relative to a first and/or a second spatial direction can be created, while at the same time a desired rigidity relative to a third spatial direction is obtained. Preferably, the elastically deformable zone extends in the direction of a longitudinal axis of the vehicle. In particular, this orientation is obtained with a chassis component fitted into a chassis of a vehicle. Concave and/or convex sections of the elastically deformable zone can extend in alternation in opposite directions of a vehicle axis. For example, the concave and convex sections can be in the form of wave troughs or wave peaks.

According to a further development, the connecting section and/or its elastically deformable zone is formed of a plate-like strip of material. In particular the strip of material has a material thickness in the direction of a transverse vehicle axis. Preferably, this orientation is obtained in a chassis component fitted in a chassis. In particular the material thickness is smaller than a width of the strip of material by at least 50%, by at least 75% or by at least 90% in the direction of a vertical axis of the vehicle. This enables the desired elastic deformability of the connecting section relative to the first and/or second spatial direction to be obtained, as well as the desired rigidity relative to the third spatial direction.

In particular, the connecting section and/or the elastically deformable zone is made from a sheet-metal material or from a plastic material, especially one that is fiber-reinforced.

Preferably the inner joint component comprises a joint stud which extends out of a recess in the chassis component, in which recess the inner joint component is fitted and can move in an articulated manner. A bearing shell can be arranged between the recess and the inner joint component, in particular the joint ball of the inner joint component. Preferably the bearing shell is made of plastic and/or it is fitted rotationally fixed relative to the recess. In particular the joint stud is designed for mounting on a rubber mounting, or a rubber mounting is fitted onto the joint stud. Preferably, the rubber mounting is pressed or screwed onto the joint stud. The joint stud can have knurling in order to produce a particularly firm interlocking and/or frictional connection to the rubber mounting.

A stabilizer arrangement for a chassis of a vehicle, especially a motor vehicle with a chassis component according to the invention, is particularly advantageous. In particular the chassis component is in the form of a pendulum support. The stabilizer arrangement can be made as a torsion-beam axle. The stabilizer arrangement comprises a stabilizer body. In particular the stabilizer body can be subjected to torsion and/or bending. The stabilizer body can have a U-shape or can be essentially U-shaped. Alternatively, the stabilizer body can have an H-shape or can be essentially H-shaped. The stabilizer is mounted on a vehicle chassis or a vehicle body by means of two rubber mountings.

The first end section of the chassis component is attached to the stabilizer body. For example, the first end section of the chassis component is screwed or welded to the stabilizer body. In particular, the first end section of the chassis component is connected rigidly to the stabilizer body. The second end section of the chassis component is mounted on the vehicle chassis, on the vehicle body, and/or on one of the two rubber mountings. In particular the second end section has the ball joint with the sensor device. In particular, owing to the fixing of the joint stud to the vehicle frame, the second end section is fitted to the vehicle body and/or to one of the two rubber mountings. Preferably, the joint stud is attached to the vehicle frame or to the vehicle body, and at the same time the rubber mounting is fitted onto the joint stud. In particular, the rubber mounting is plugged, pressed or screwed onto the joint stud.

Particularly during a compression or extension movement of the stabilizer arrangement, the elastically deformable zone of the connecting section compensates a movement of the stabilizer arrangement in the direction of the X-axis and/or the Y-axis. In contrast, relative to the Z-axis the chassis component or its connecting section is made rigid or inelastic, so that the sensor device can detect the necessary data with a view to a desired determination of height level information, without interfering factors.

Preferably, the stabilizer arrangement is developed further in accordance with the design features explained in connection with the chassis component described herein. Furthermore, the chassis component described herein can be developed further in accordance with the design features explained in connection with the stabilizer arrangement.

BRIEF DESCRIPTION OF THE DRAWINGS

Below, the invention is explained in greater detail with reference to the figures. In these, the same indexes refer to the same, similar or functionally equivalent components. The figures show.

DETAILED DESCRIPTION OF THE PREFERRED EMBODIMENTS

Figure 1:
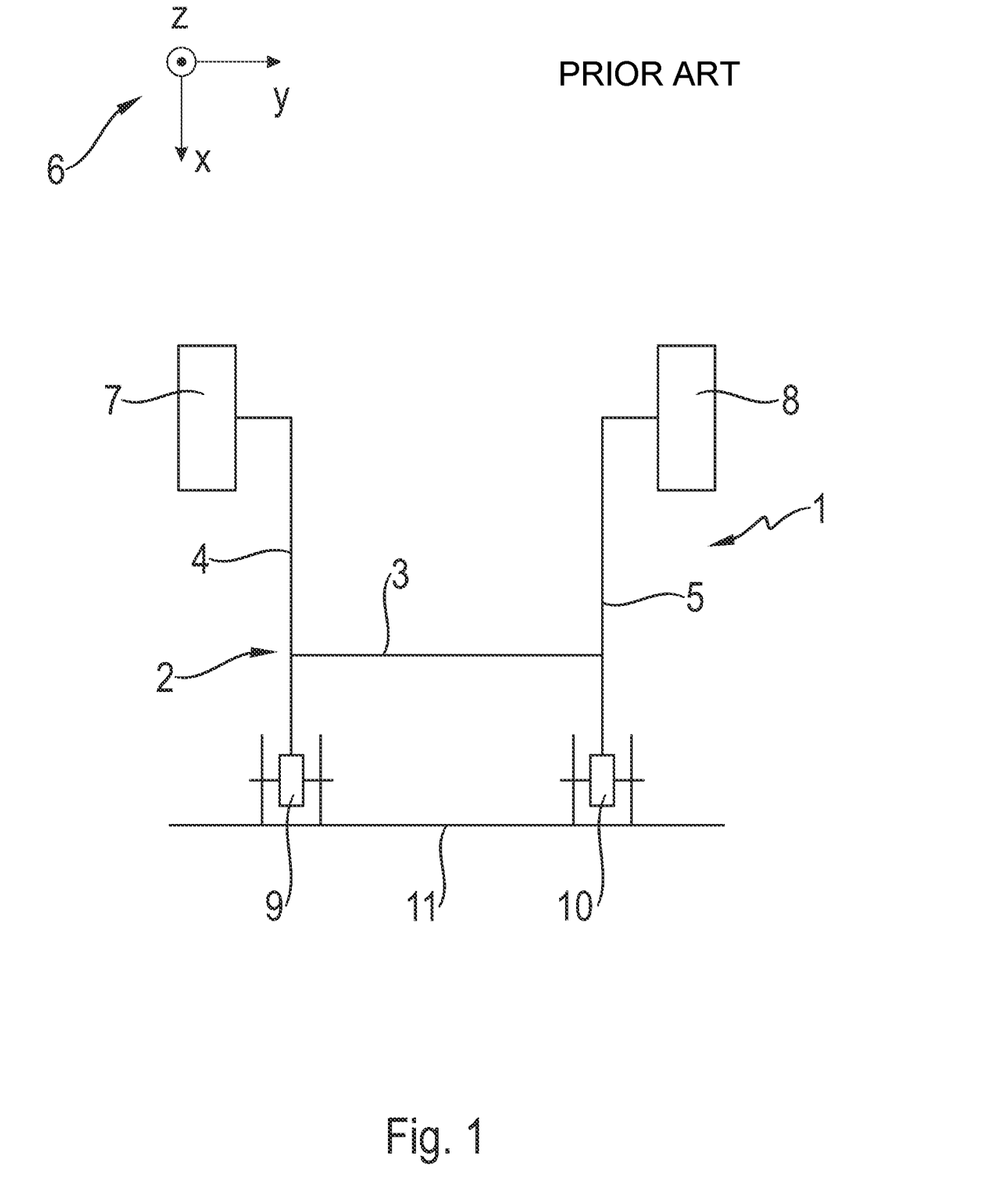
FIG. 1: A schematic view from above, of a stabilizer arrangement not according to the invention.

FIG. 1 shows a schematic view from above, of a stabilizer arrangement 1 not according to the invention. In this example embodiment the stabilizer arrangement 1 is in the form of a torsion-beam axle. The stabilizer arrangement 1 comprises a stabilizer body 2. The stabilizer body 2 can be loaded in torsion and/or bending. Usually, the stabilizer body 2 is essentially of U-shaped design. In the structure of the stabilizer arrangement 1 illustrated here as a torsion-beam axle, the stabilizer body 2 is essentially of H-shaped design. In this example embodiment, the stabilizer body 2 comprises a cross-strut 3 and two longitudinal struts 4 and 5. The cross-strut 3 is arranged between the longitudinal struts 4, 5. In an assembled condition of the stabilizer arrangement 1, the longitudinal struts 4 and 5 extend in the direction of an X-axis of a Cartesian vehicle co-ordinate system 6. The cross-strut 3 extends in the direction of a Y-axis of the vehicle co-ordinate system 6. In this case the X-axis corresponds to a longitudinal direction of the vehicle and the Y-axis to a transverse direction of the vehicle.

On the stabilizer arrangement 1 there are arranged two wheels 7 and 8. In this case, a wheel 7 or 8 is arranged, respectively, at a free end of each of the longitudinal struts 4 or 5. At the free ends of the longitudinal struts 4 or 5 remote from the wheels 7, 8, the stabilizer body 2 is mounted on a vehicle frame 11 by means of two respective rubber mountings 9 and 10. In detail, an end of the longitudinal strut 4 remote from the wheel 7 is mounted on the vehicle frame 11 by the rubber mounting 9. An end of the longitudinal strut 5 remote from the wheel 8 is mounted on the vehicle frame 11 by the rubber mounting 10.

Figure 2:
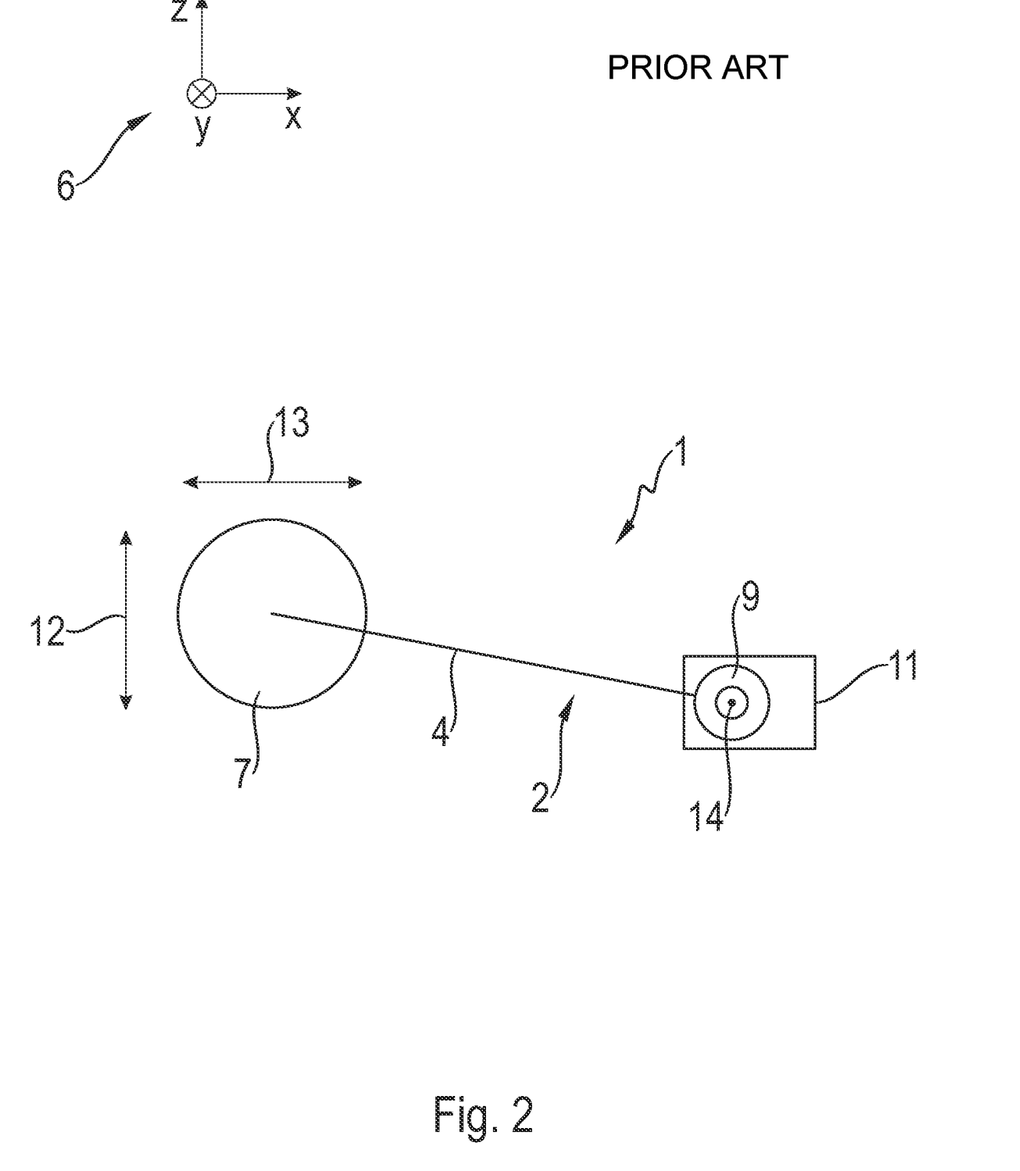
FIG. 2: A schematic side view of the stabilizer arrangement according to FIG. 1, FIG. 3: A schematic view from above, of a stabilizer arrangement according to the invention, with a chassis component according to the invention.

FIG. 2 shows a schematic side view of the stabilizer arrangement 1 according to FIG. 1. When the stabilizer arrangement 1 is used in a vehicle, owing to unevenness of the road, for example the wheel 7 moves in the direction of a Z-axis of the vehicle co-ordinate system 6, in accordance with the arrow 12. In this case the Z-axis corresponds to a vertical direction of the vehicle. In other words, the wheel 7 moves up and down in the vertical direction of the vehicle. Correspondingly, the stabilizer arrangement 1 or stabilizer body 2 also moves along the Z-axis, so that the rubber mountings 9 and 10 form a rotational axis 14 for the stabilizer arrangement 1 or the stabilizer body 2. These rotational axes 14 extend in the transverse direction of the vehicle, namely in the direction of the Y-axis of the vehicle co-ordinate system 6.

In addition, however, there is also movement of the stabilizer arrangement 1 or stabilizer body 2 in accordance with the arrow 13 in the direction of the X-axis of the vehicle co-ordinate system 6, that is to say, in the longitudinal direction of the vehicle. In other words, when an upward or downward movement takes place in accordance with the arrow 12, there is at the same time also a displacement—although small relative to the movement in the vertical direction of the vehicle—of the rotational axis 14 formed by the rubber mountings 9, 10 in the longitudinal direction of the vehicle, i.e. in the direction of the X-axis.

If now a sensor device (not shown here) is to be used in order, in respect of the wheels 7, 8, to derive height level information for the wheel 7 and/or the wheel 8 relative to the vehicle frame 11, the rubber mounting 9 or 10 is not automatically suitable for arranging such a sensor device, since the movement that occurs in accordance with the arrow 13 would represent an interfering variable.

Figure 3:
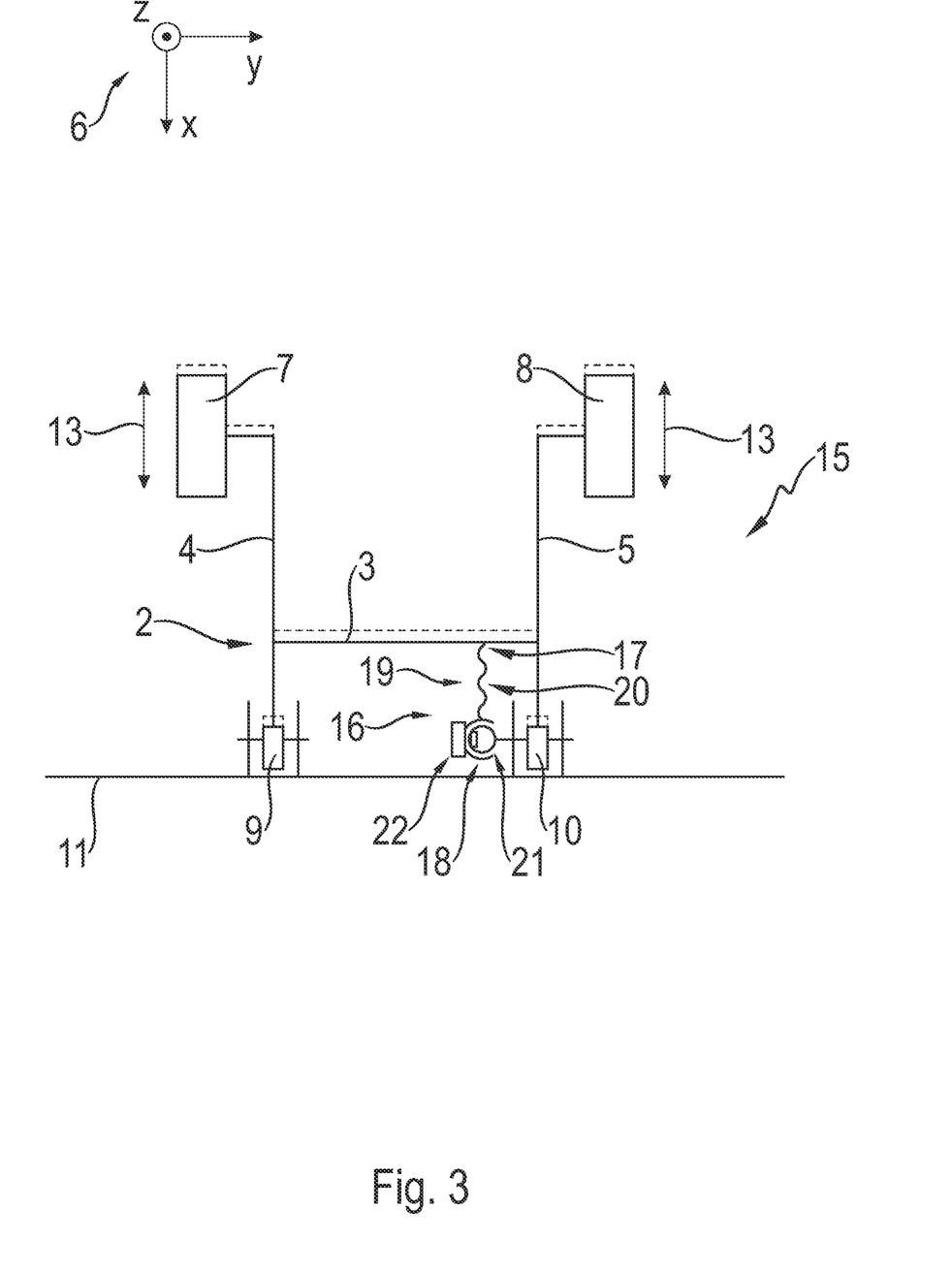

FIG. 3 shows a schematic view from above, of a stabilizer arrangement 15 according to the invention with a chassis component 16 according to the invention. Apart from the added chassis component 16, the stabilizer arrangement 15 corresponds to the stabilizer arrangement 1 according to FIGS. 1 and 2. The same features have the same indexes as before. Accordingly, to avoid repetitions reference should be made to the previous description.

The vehicle component 16 comprises a first end section 17 and a second end section 18. The first end section 17 is attached to the stabilizer body 3. The second end section 18 is mounted on the vehicle frame 11 and in this example embodiment by way of the rubber mounting 10. Between the two end sections 17, 18 the chassis component 16 comprises a connecting section 19. The connecting section 19 has an elastically deformable zone 20. In this example embodiment the entire connecting section 19 is in the form of an elastically deformable zone 20. In relation to its longitudinal axis, the vehicle component 16 is orientated in the longitudinal direction of the vehicle or in the direction of the X-axis of the vehicle co-ordinate system 6.

In this example embodiment the second end section 18 comprises a ball joint 21. The ball joint 21 is in the form of a ball stud joint. Furthermore, a sensor device 22 is associated with the ball joint 21. The sensor device 22 is designed such that by means of the sensor device 22, an angle variation produced by a movement of the stabilizer arrangement 1 or the stabilizer body 2 in the vertical direction of the vehicle or in the direction of the Z-axis of the vehicle co-ordinate system 6, can be detected. From this, height level information relating to the wheels 7 and 8 can be determined.

Displacement of the stabilizer arrangement 1 or the stabilizer body 2 in the longitudinal direction of the vehicle or in the direction of the X-axis of the vehicle co-ordinate system 6 in accordance with the arrow 13, is indicated by broken lines. This displacement takes place when the stabilizer arrangement 1 or the stabilizer body 2 moves in the vertical direction of the vehicle in accordance with the arrow 12 (see FIG. 2 and the associated description). By virtue of the elastically deformable zone 20, this movement in accordance with the arrow 13 can be compensated. The structure and functional mode of the chassis component 16 will be explained with reference to the next figure.

Figure 4:
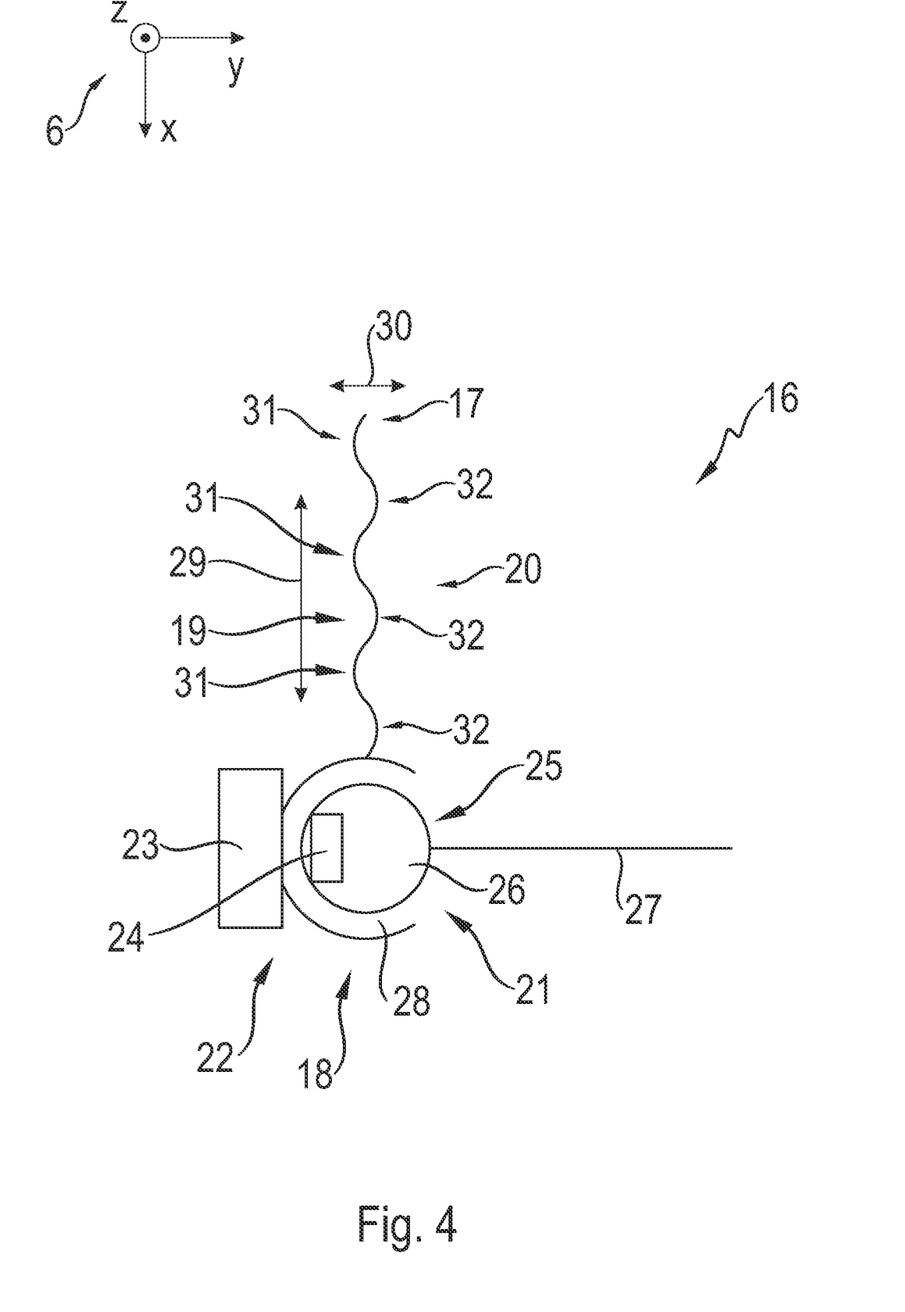
FIG. 4: A schematic view from above, of the chassis component according to the invention shown in FIG. 3.

FIG. 4 shows a schematic view from above, of the chassis component 16 according to the invention, as shown in FIG. 3. The sensor device 22 comprises a first sensor element 23 and a second sensor element 24. The first sensor element 23 is arranged on the second end section 18. In this example embodiment the first sensor element 23 is in the form of a Hall sensor sensitive to magnetic fields. The second sensor element 24 is arranged on an inner joint component 25 of the ball joint 21. In this case the inner joint component 25 is in the form of a ball stud. Correspondingly, the inner joint component 25 has a joint ball 26 and a joint stud 27. The second sensor element 24 is arranged in or on the joint ball 26. In this example embodiment the second sensor element 24 is in the form of a magnet.

The joint ball 26 is arranged in the area of the second end section 18, in a recess 28 of the chassis component 16 in such manner that it can move in an articulated way. Here, the joint stud 27 extends out of the recess 28. According to FIG. 3 the chassis component 16 is fixed to the vehicle frame 11 by way of the joint stud 27. In this case, according to FIG. 3 the rubber mounting 10 is at the same time fitted or pressed or screwed onto the joint stud 27.

As indicated by the arrow 29, the elastically deformable zone 20 enables the connecting section 19 to deform elastically in a specific first spatial direction. Here, the first spatial direction corresponds to the longitudinal axis of the vehicle or the X-axis of the vehicle co-ordinate system 6.

Furthermore, as indicated by the arrow 30 the elastically deformable zone 20 enables an elastic deformation of the connecting section 19 in a specific second spatial direction, this second spatial direction corresponding to a transverse direction of the vehicle, that is to say, a direction along the Y-axis of the vehicle co-ordinate system 6.

In contrast, relative to a third spatial direction, namely the vertical direction of the vehicle or the direction along the Z-axis of the vehicle co-ordinate system 6, the connecting section 19 is made rigid or inelastic. Thus, relative to the desired measurement direction in the vertical direction of the vehicle or in the direction of the Z-axis the chassis component 16 is made rigid, whereas possible interfering factors in the longitudinal and/or the transverse direction of the vehicle can be compensated by virtue of the elastically deformable zone 20.

In this example embodiment as viewed from above, the elastically deformable zone 20 has a wave-like contour. In detail, the elastically deformable zone 20 has a plurality of concave sections 31 and convex sections 32. Along the longitudinal axis or X-axis of the vehicle co-ordinate system 6, the concave and convex sections 31, 32 extend alternately in opposite directions relative to the transverse axis or Y-axis of the vehicle co-ordinate system 6. The concave and convex sections 31, 32 are arranged in alternation in the longitudinal direction of the vehicle, i.e. along the X-axis of the vehicle co-ordinate system 6.

In this example embodiment, the connecting section 19 or the elastically deformable zone 20 is formed from a plate-like strip of material. In this example embodiment the material thickness of the connecting section 19 or the elastically deformable zone 20 is at least 75% less than a width of the connecting section 19 or the elastically deformable zone 20. The material thickness extends in the direction of the transverse axis of the vehicle or the direction of the Y-axis of the vehicle co-ordinate system 6. The width extends in the direction of the vertical axis of the vehicle or the direction of the Z-axis of the vehicle co-ordinate system 6.

INDEXES

1 Stabilizer arrangement
2 Stabilizer body
3 Cross-strut
4 Longitudinal strut
5 Longitudinal strut
6 Vehicle co-ordinate system
7 Wheel
8 Wheel
9 Rubber mounting
10 Rubber mounting
11 Vehicle frame
12 Arrow
13 Arrow
14 Rotational axis
15 Stabilizer arrangement
16 Chassis component
17 First end section
18 Second end section
19 Connecting section
20 Elastically deformable zone
21 Ball joint
22 Sensor device
23 First sensor element
24 Second sensor element
25 Inner joint component
26 Joint ball
27 Joint stud
28 Recess
29 Arrow
30 Arrow
31 Concave section
32 Convex section

The invention claimed is:

1. A chassis component with a first end section and a second end section,
    a connecting section being arranged between the first and the second end sections,
    at least one ball joint in one of the first and the second end sections,
    a sensor device being associated with the ball joint,
    a first sensor element of the sensor device being arranged on the end section having the ball joint and a second sensor element being arranged on an inner joint component of the ball joint,
    wherein said connecting section comprises an elastically deformable zone, and the elastically deformable zone has a contour that alternates several times between concave and convex, forming a wave-like or saw-tooth configuration, and the elastically deformable zone extends in a direction of a longitudinal axis of the vehicle so that concave and/or convex sections of the elastically deformable zone alternately extend in opposite directions of a transverse axis of the vehicle.

2. The chassis component according to claim 1, wherein the elastically deformable zone is formed by the connecting section itself or by an elastic portion or part-section arranged in the connecting section.

3. The chassis component according to claim 1, wherein the connecting section and/or the elastically deformable zone is made from a plate-like strip of material, and the strip of material has a thickness, in a direction of the transverse axis of the vehicle, which thickness is less by at least 50% than a width of the strip of material in a direction of a vertical axis of the vehicle.

4. The chassis component according to claim 1, wherein the connecting section and/or the elastically deformable zone is made from a plate-like strip of material, and the strip of material has a thickness, in a direction of the transverse axis of the vehicle, which thickness is less by at least 75% than a width of the strip of material in a direction of a vertical axis of the vehicle.

5. The chassis component according to claim 1, wherein the connecting section and/or the elastically deformable zone is made from a plate-like strip of material, and the strip of material has a thickness, in a direction of the transverse axis of the vehicle, which thickness is less by at least 90% than a width of the strip of material in a direction of a vertical axis of the vehicle.

6. The chassis component according to claim 1, wherein the connecting section and/or the elastically deformable zone is made from a sheet-metal material or a plastic material.

7. The chassis component according to claim 1, wherein the connecting section and/or the elastically deformable zone is made from a fiber-reinforced plastic material.

8. The chassis component according to claim 1, wherein the inner joint component comprises a joint stud, which extends out of a recess in the chassis component in which the inner joint component is fitted and able to move in an articulated manner, and the joint stud is designed for fitting with a rubber mounting or the rubber mounting is fitted onto the joint stud.

9. A stabilizer arrangement for a chassis of a vehicle with a chassis component according to claim 1, wherein a stabilizer body is mounted by two rubber mountings on a vehicle frame or a vehicle body, and the first end section of the chassis component is fixed to the stabilizer body and the second end section of the chassis component is mounted on the vehicle frame, on the vehicle body and/or on one of the two rubber mountings.

10. A chassis component with a first end section and a second end section,
a connecting section being arranged between the first and the second end sections,
at least one ball joint in one of the first and the second end sections,
a sensor device being associated with the ball joint,
a first sensor element of the sensor device being arranged on the end section having the ball joint and a second sensor element being arranged on an inner joint component of the ball joint,
wherein said connecting section comprises an elastically deformable zone, and
the elastically deformable zone enables elastic deformation of the connecting section exclusively in a first spatial direction and a second spatial direction, the first and the second spatial directions are two of three spatial directions that make up a Cartesian vehicle co-ordinate system, and the first spatial direction is along an X-axis in a longitudinal direction of the vehicle and the second spatial direction is a Y-axis in a transverse direction of the vehicle, the first spatial direction is orientated perpendicularly to the second spatial direction.

11. The chassis component according to claim 10, wherein the elastically deformable zone enables elastic deformation of the connecting section exclusively in the first spatial direction.

12. The chassis component according to claim 10, wherein the elastically deformable zone and/or the connecting section is made inelastic and/or rigid exclusively in a third spatial direction, wherein the third spatial direction is another one of the three spatial directions that make up the Cartesian vehicle co-ordinate system, and the first spatial direction is orientated perpendicularly to the third spatial direction, and the third spatial direction is a Z-axis in a vertical direction of the vehicle.

* * * * *